United States Patent [19]

Vermesse

[11] Patent Number: 5,444,631
[45] Date of Patent: Aug. 22, 1995

[54] FRANKING MACHINE WITH RECORD STORAGE FACILITY

[75] Inventor: Bernard Vermesse, L'Hay les Roses, France

[73] Assignee: Neopost, Bagneux, France

[21] Appl. No.: 175,538

[22] Filed: Dec. 30, 1993

[30] Foreign Application Priority Data

Dec. 30, 1992 [FR] France .................... 92 15933

[51] Int. Cl.⁶ .................... G06F 17/60; G07B 17/02
[52] U.S. Cl. .................... 364/464.02; 364/406
[58] Field of Search .......... 364/464.02, 464.03, 364/406

[56] References Cited

U.S. PATENT DOCUMENTS

| | | | |
|---|---|---|---|
| 4,377,214 | 3/1983 | Hansen et al. | 177/25.15 |
| 4,495,581 | 1/1985 | Piccione | 364/567 X |
| 4,511,793 | 4/1985 | Racanelli | 235/375 |
| 4,713,769 | 12/1987 | Hills et al. | 364/464.02 |
| 4,731,749 | 3/1988 | Kirschner et al. | 364/DIG. 2 |
| 4,734,865 | 3/1988 | Scullion et al. | 364/478 |
| 4,817,004 | 3/1989 | Kroll et al. | 364/464.02 |
| 4,853,865 | 8/1989 | Sansone et al. | 364/464.02 |
| 4,888,803 | 12/1989 | Pastor | 380/51 |
| 4,916,623 | 4/1990 | Check, Jr. | 364/464.02 |
| 4,931,943 | 6/1990 | Vermesse | 364/464.02 |
| 4,962,459 | 10/1990 | Mallozzi et al. | 364/464.02 |
| 4,984,191 | 1/1991 | Vermesse | 364/464.02 X |
| 5,245,545 | 9/1993 | Taylor | 364/478 |
| 5,257,196 | 10/1993 | Sansone | 364/464.02 |
| 5,383,115 | 1/1995 | Lecarpentier | 364/464.02 X |

FOREIGN PATENT DOCUMENTS

| | | |
|---|---|---|
| 0172573 | 2/1986 | European Pat. Off. . |
| 0173249 | 3/1986 | European Pat. Off. . |
| 0328059 | 8/1989 | European Pat. Off. . |
| 0376487 | 4/1990 | European Pat. Off. . |
| 0392895 | 10/1990 | European Pat. Off. . |
| 0493948 | 7/1992 | European Pat. Off. . |
| 2620249 | 10/1989 | France . |
| 2665003 | 1/1992 | France . |

*Primary Examiner*—Edward R. Cosimano
*Attorney, Agent, or Firm*—Sughrue, Mion, Zinn, Macpeak & Seas; Raymond C. Turner; Joseph J. Buczynski

[57] ABSTRACT

A franking machine includes a non-volatile record memory and circuits for writing information into this memory only if at least one characteristic of a franking operation is different from that for the immediately preceding operation. For example, for a series of franking operations having the same value, the record memory contains only a block of information indicating the franking value common to each operation and the number of operations per formed. The required record memory capacity is therefore significantly smaller than if it were to store an information block respective to each franking operation.

3 Claims, 3 Drawing Sheets

FRANKING MACHINE WITH RECORD STORAGE FACILITY

BACKGROUND OF THE INVENTION

Field of the Invention

The invention concerns a franking machine which can store a record giving the characteristics of each franking operation carried out by the machine. A record of this kind has many applications including: production of statistics, accounting differentiated by departments within a company, accounting differentiated by postal organizations, etc.

Description of the Prior Art

It is desirable for franking machines to be able to generate statistics for the postal organizations using them. If they know the characteristics of each franking operation they can obtain a better statistical knowledge of the postal traffic generated by the franking machines: for example, the number of mail items sent in particular postal charge bands during given periods of the year.

In some countries there is more than one postal organization. They could use the same franking machines, but the latter would then have to enable separate accounts to be produced for each organization.

Users are usually companies having various departments each of which accounts separately for its postal expenses, but sharing a single franking machine. It is then desirable to be able to produce accounts which differentiate franking operations department by department.

The value added tax could feasibly differ according to the particular mailing service used, for example, or all users could be offered a different discount for different types of service. This is another instance in which it is desirable to be able to produce accounts which differentiate between different types of service.

All these applications require a large number of characteristics on each franking operation, covering a long period of time. The main conventional source of information used by postal organizations is a monthly form with one line per day. At the end of each day the user writes on the form the total amount franked indicated by a non-resettable counter. The user calculates the amount for that day by subtracting the total for the previous day from the new total and writes this on the form.

This information is too succinct for producing detailed accounts or statistics and is insufficiently reliable because many users fail to fill in each line of the form as they should.

Also, conventional franking machines are not capable of supplying this quantity of information. A conventional franking machine has two low capacity memories with battery back-up intended primarily to store the total amounts for the franking operations performed. Each of the memories stores this total amount, for added security.

French patent application No 2 665 003 describes a franking machine which can produce a bar chart showing the numbers of franking operations for nine different predetermined franking amounts. It also totals the number of operations for all the other values. This requires ten counters. Changes to postal charges are a serious problem because it is not possible for the staff of the postal organization to modify all the franking machines on the specific day on which the change comes into effect. French patent application No 2 665 003 proposes a solution which entails predetermining the nine values to be monitored by memorizing the first nine different values used for the first franking operations carried out after a credit reloading operation in the case of a pre-payment machine. This is a learning process, as it were.

A drawback of this learning process is that one or more non-standard values may appear along the abscissa axis of the bar chart if the user makes mistakes in selecting the first nine different franking values.

Another way to generate statistics is to memorize the characteristics of each operation, including its date and its value, and to apply statistical processing, to produce a bar chart, for example, only when the information is read out from memory. It is then possible to base each operation on an exact price. French patent application No 2 620 249 describes a franking machine comprising a calendar circuit and a non-volatile memory for storing the content of the non-resettable counter and the date for each day on which the machine is used together with the monthly consumption over a period of two months. The monthly consumption and the date are insufficient information for producing statistics. A more refined knowledge is required of the characteristics of each operation over a longer period. A more refined knowledge of the characteristics of each operation would also be required to produce separate accounts.

European patent application No 172 573 describes a franking machine which has three memories. A volatile first memory includes:

an "up" register holding the total amount for the franking operations;

a "down" register holding a credit value and used to check the accuracy of the value in the up register; and a register containing a cyclic redundancy check code and error checksums.

At the time of each franking operation a microprocessor subtracts the value of the franking operation from the content of the down register, adds this same value to the content of the up register, and then writes the new content of the up register, the new content of the down register and possibly other characteristics of the operation such as the total number of mail items franked into fixed locations in the first memory.

It also writes them into a non-volatile second memory at successive locations respective to successive franking operations. This EEPROM type second memory can hold the characteristics of the last 128 franking operations. Once it is filled, the first addresses of this memory are re-used. This memory therefore holds a record concerning only the most recent franking operations, the number of these operations being too low for producing statistics because for meaningful results to be obtained it is necessary to know the characteristics of each franking operation over a long period, as much as one year, for example. Also, this memory does not store the date.

A non-volatile CMOS third memory stores at fixed locations the cumulative values contained in the up register, the down register and a number of mail items register (if any) during a power outage in order to back-up this cumulative information which is essential for billing the franking operations. As only the cumulative values are backed up there is no way that statistics can be established from these values.

With the aim of being able to produce statistics it is feasible to modify a franking machine like that described in European patent application No 0 172 573 by increasing the number of franking operations processed and by increasing the number of characteristics stored for each franking operation. The necessity then arises of using a record memory having a very large capacity to enable production of statistics over a long period. This very large capacity would significantly increase the cost of the machine.

A known way to establish a separate account for each postal organization or for each department within a company is to store a plurality of up counters and a plurality of down counters, rather than only one, in a non-volatile memory with a back up memory. This solution is not very satisfactory, however: either it requires a memory capacity that would be of no utility to most users, or it restricts the number of counters to a value that is too low for some users.

An object of the invention is to propose a franking machine which can generate statistics and produce separate accounts for different departments within a company or for different postal organizations without any notable increase in the cost of the machine.

SUMMARY OF THE INVENTION

The invention consists in a franking machine comprising a non-volatile memory and means for writing into said memory information indicating monitored characteristics of all franking operations carried out during a long period of time, said characteristics including the date of the franking operation, the monetary value of the franking operation and the postal service used for said franking operation, in which machine the means for writing information are adapted:

a) not to write information into the memory if the monitored characteristics of the current franking operation are not different from those of the immediately preceding franking operation; and b) to write information into the memory if at least one monitored characteristic of the current franking operation differs from that of the immediately preceding franking operation, the information stored in the memory being representative of said characteristic which has changed between two franking operations and being stored in the memory in the form of fixed length data blocks.

Consider, for example, the situation in which the user franks 500 mail items with a value of FF 2.50 and then starts another series of franking operations with a different value, such as FF 3.40, for example. When the user carries out the first franking operation in the amount of FF 3.40 the means for writing information into this memory detect the change of value and write into the memory an information block indicating the value of the franking operation or operations just performed, i.e. FF 2.50, and the number of consecutive preceding operations for which the value was FF 2.50 (which is 500 in this example). This example shows that the machine in accordance with the invention can allow for a long series of franking operations of the same value in generating statistics or producing accounts by storing only one block of information, which considerably reduces the memory capacity required as compared with a memory in which each franking operation would require the writing of information.

To generate statistics or to produce accounts which differentiate between other characteristics all that is required is to write into the memory blocks identifying the respective other characteristics in order to find in the record memory the blocks indicating the required characteristics. This could be, for example, all the franking operations carried out between two mailing service indications, and thus all corresponding to one type of service, which is indicated at the start of the series. The number of consecutive franking operations for the same type of service is indicated in the information block indicating the end of the series and the start of another.

The same goes for producing accounts or generating statistics which differentiate between different departments within a company or between different postal organizations.

The machine in accordance with the invention can therefore process a large number of characteristics without it being necessary to provide a counter for each characteristic in advance. This additionally simplifies implementation as compared with prior art type machines which have a counter for each characteristic, for example for each department within a company.

The characteristics on which statistics are based are highly diverse and at any particular time some may be unknown as yet. The length of the information to be written each time a characteristic of the franking operations is changed therefore varies and can be difficult to predict exactly. For example, the number of digits expressing the franking value and the number of digits expressing the cumulative total of franking values vary considerably from country to country. The inclusion of a code in the blocks of data which identifies a specific characteristic of a franking operation can overcome the problem of formatting the information stored in the non-volatile memory.

The non-volatile memory is particularly simple to manage as it suffices to increment regularly an address pointer to write or read a block of data. Great flexibility is also offered in terms of the choice of characteristics as it is possible to differentiate between different types of information by means of a code indicating the type of characteristics. Finally, for a characteristic requiring a particularly large memory capacity it is possible to subdivide the information into a plurality of blocks written successively into the non-volatile memory, the information type code showing that these blocks constitute a common set of information to be processed as a whole.

By reading out from the record memory the franking value stored for a series of identical operations and the number of operations in this series it is a simple matter to calculate the total amount for the operations in the series, The total amount for all the operations of any kind carried out since a given first operation is calculated by cumulating these amounts, Unfortunately; a single error in the stored information can throw out the calculation of the total amount for operations since a given first operation, Another object of the invention is therefore to remedy this drawback.

According to another feature of the invention the means for writing the information additionally supply the total amount of franking operations periodically to the memory.

This feature makes it possible to determine again the exact value of the total amount for the franking operations since a given operation even if one or more blocks of information are subject to an error during the relevant period. This total amount is critical for invoicing for the franking operations and this feature protects it against the consequences of an error in the information reflecting the changes of franking values or the information reflecting the number of franking operations in a series for a given franking value.

The invention is explained in more detail in and other features of the invention emerge from the following description and the appended drawings.

DETAILED DESCRIPTION OF THE INVENTION

Figure 1:
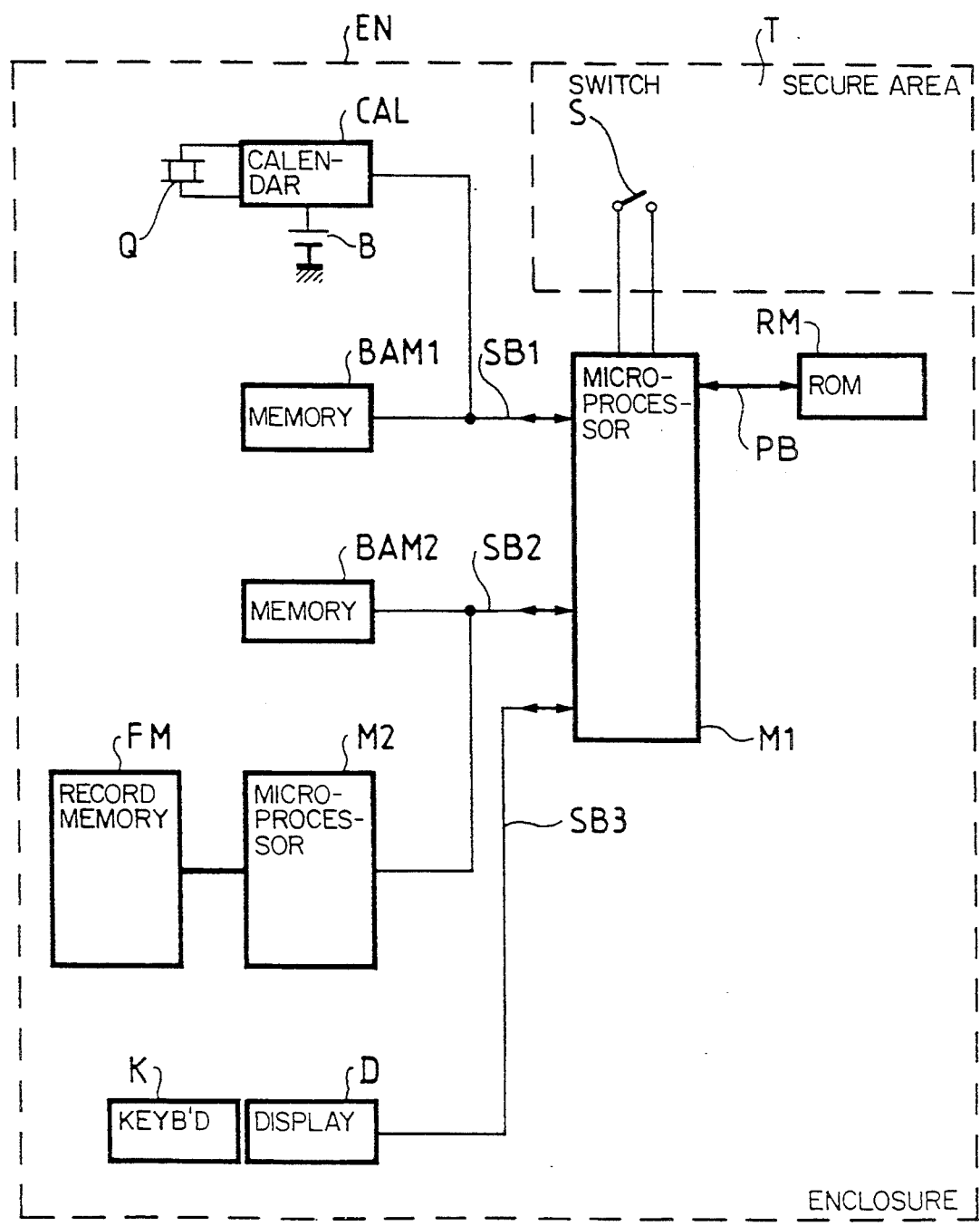
FIG. 1 is a block diagram of one embodiment of a franking machine in accordance with the invention.

The embodiment of the invention shown in FIG. 1 has a protected enclosure EN containing the electronic circuits which must be kept out of reach of the user in order to prevent fraud. These electronic circuits include:
- a first microprocessor M1 carrying out franking machine control operations on the basis of a program stored in a read only memory RM connected to the microprocessor M1 by a parallel bus PB;
- two memories BAM1 and BAM2 with battery backup containing conventional registers: an "up" register for the total amount of franking operations, a "down" register for the remaining credit and a register storing the number of franking operations; these three registers are duplicated in the two memories;
- a calendar circuit CAL with an associated quartz crystal oscillator Q and a back up battery B;
- a non-volatile "flash" type record memory FM with an associated second microprocessor M2 responsible for managing addressing of the memory FM and for storing temporarily the blocks of information to be stored in the memory FM;
- a keyboard K with an associated display D enabling an operator to input commands to the franking machine and to read off information concerning its operations;
- a switch S in a secure area T of the enclosure EN accessible via a door with a tamper-indicative seal to enable the staff of the postal organizations to recharge the credit of the down register and to update the time and date in the calendar circuit CAL.

The tamper-indicative seal door prevents access by the user of the machine to the switch S to prevent any fraudulent tampering with the credit or the date of franking. The machine is credited and the time and dates are reset at regular intervals (every six months, for example) by a member of the staff of a postal organization. In addition to the tamper-indicative seal door, a secret numeric code may have to be entered on the keyboard K to authorize a credit or a date and time change.

A serial synchronous bus SB1 connects a port of the microprocessor M1 to an input of the memory BAM1 and to an input of the calendar circuit CAL. A second serial synchronous bus SB2 connects a port of the microprocessor M1 to a port of the memory BAM2 and to a port of the microprocessor M2. A third serial synchronous bus SB3 connects a port of the microprocessor M1 to a port of the combined keyboard K and display D.

The non-volatile memories BAM1 and BAM2 are used in the conventional manner. During each franking operation the microprocessor M1 updates the up register, the down register and the number of operations register in the memory BAM1. It then reads the content of this memory to check that the update has gone correctly. It then performs the same update in the memory BAM2. Finally, it transmits to the microprocessor M2 all of the information constituting a block of information to be written into the record memory FM.

The parallel connection of the calendar circuit CAL and the memory BAM1 to the bus SB1 does not compromise the security of the information stored in this memory as the microprocessor M1 reads the date and time (hour and minute) supplied by the circuit CAL at infrequent intervals: only when the franking machine is switched on or off. It is therefore most improbable that reading the calendar will cause accidental writing in the memory BAM1.

The microprocessor M2 is associated with a program store (not shown) which may be a read only memory (ROM) incorporated in the microprocessor M2. The microprocessor M2 accesses the record memory FM each time any of the franking parameters (value, date, power outage, etc) changes. It is at this time that the microprocessor M2 updates the record memory FM by writing into it a number of information blocks. The microprocessor M1 supplies an information block to the microprocessor M2 each time that it realizes that at least one characteristic of the franking operations has been modified and the microprocessor M2 writes this block immediately into the memory FM. The modification may be caused by the user configuring the machine via the keyboard K. The microprocessor M1 supplies to the microprocessor M2 a block indicating the date of the last switch-on, each day that the machine is used, and a block indicating the time, each time that the machine is switched on or off.

The programs executed by the microprocessors M2 and M2 are of a kind familiar to the person skilled in the art.

The record memory FM is a flash type memory. This type of memory has a high capacity, can be rewritten and does not require any backup power supply. However, it has the drawback of tolerating only a limited number of erasures, typically 10 000, and of allowing erasing of only an entire memory chip or an individual memory page. In this application a capacity of 128 kbytes, 256 kbytes or 1 Mbyte may be used. If it is not deemed essential to retain all of the record since the machine was first put into service, it is possible to erase part of the record in order to re-use the first addresses of the record memory. It is then necessary for the memory FM to have at least two parts which can be erased independently.

The memory FM uses 19 address bits and 8 data bits, for example. To use it the information is organized into blocks each of four consecutive bytes. A memory with a capacity of 128 kbytes can therefore store 32 000 blocks. Each block of 32 bits includes:
- a 4-bit field designating the type of information contained in the block;
- a 23-bit field containing the information proper; and
- a 5-bit field containing an error correcting code based on the Hamming polynomial $x^5 + x^2 + 1$ applied to all of the block.

The person skilled in the art knows how to write an error detector program using the 5-bit field which can be executed by the microprocessor M2. This type of error detection is used conventionally for data stored in smart cards.

The various types of information are as follows, according to the hexadecimal value of the field designating the information type:

0 designates an invalidated block. Before writing information in a block the microprocessor M2 checks that all the bits of the block have been erased. If any bit has been erased badly the block is invalidated by writing the value zero in the information type field. This improves the protection of the information against errors and enables a flash memory to be used beyond the 10 000 erasures guaranteed by the manufacturer.

1 designates the date. The block contains the full date, i.e. the day, the month and the year. This block is created after the first franking operation after the franking machine is switched on for the first time in a given day.

2 designates a short value, i.e. a franking value which can be represented on 14 bits, the other 9 bits storing the number of franking operations performed for the value stored in the preceding 14 bits. The franking value can therefore be anywhere between 0 and 8191 and the number of operations can be anywhere between 1 and 511. This type of block corresponds to the most usual franking amounts which use three or four digits.

3 designates a long value, i.e. a franking value represented by 17 bits and which can be anywhere between 0 and 9999. The six information bits that follow contain the number of franking operations performed successively for the value stored in the preceding 17 bits. The maximal number of operations is therefore equal to 64.

4 designates a "special mention". The block records any change in the type of mailing: mail shots, letters, packets, etc.

5 designates the time. The block contains the hour and the minute stored each time the franking machine is switched on or off on the same date, which is beneficial if the user needs to know for how long machine is used.

6 designates a fault. The block stores the occurrence of a machine malfunction including the time (hour and minute) to provide a record of machine faults and failures.

7 designates the total, i.e. the content of the up register. The block records the total value of all franking operations since the machine was first put into service by cumulating all types of operations, irrespective of the franking value. A block of this kind makes it possible to re-establish the total value if the value calculated from the change information were erroneous due to an error in any of the information blocks.

8 designates the loading of a credit. The block records credit reloading of the down counter.

9 designates an extension block. The block contains information which is an extension of the information of the preceding block. This type of block is used if the quantity of information to be written in a block is greater than the 23 bits available in a single block.

F designates an empty block. The block does not contain any record and its perfectly erased.

The codes A through E are available for storing other types of information that could be useful for generating statistics or invoices. This could be the identity of a postal organization or of a department of the company using the machine, for example.

Figure 2:
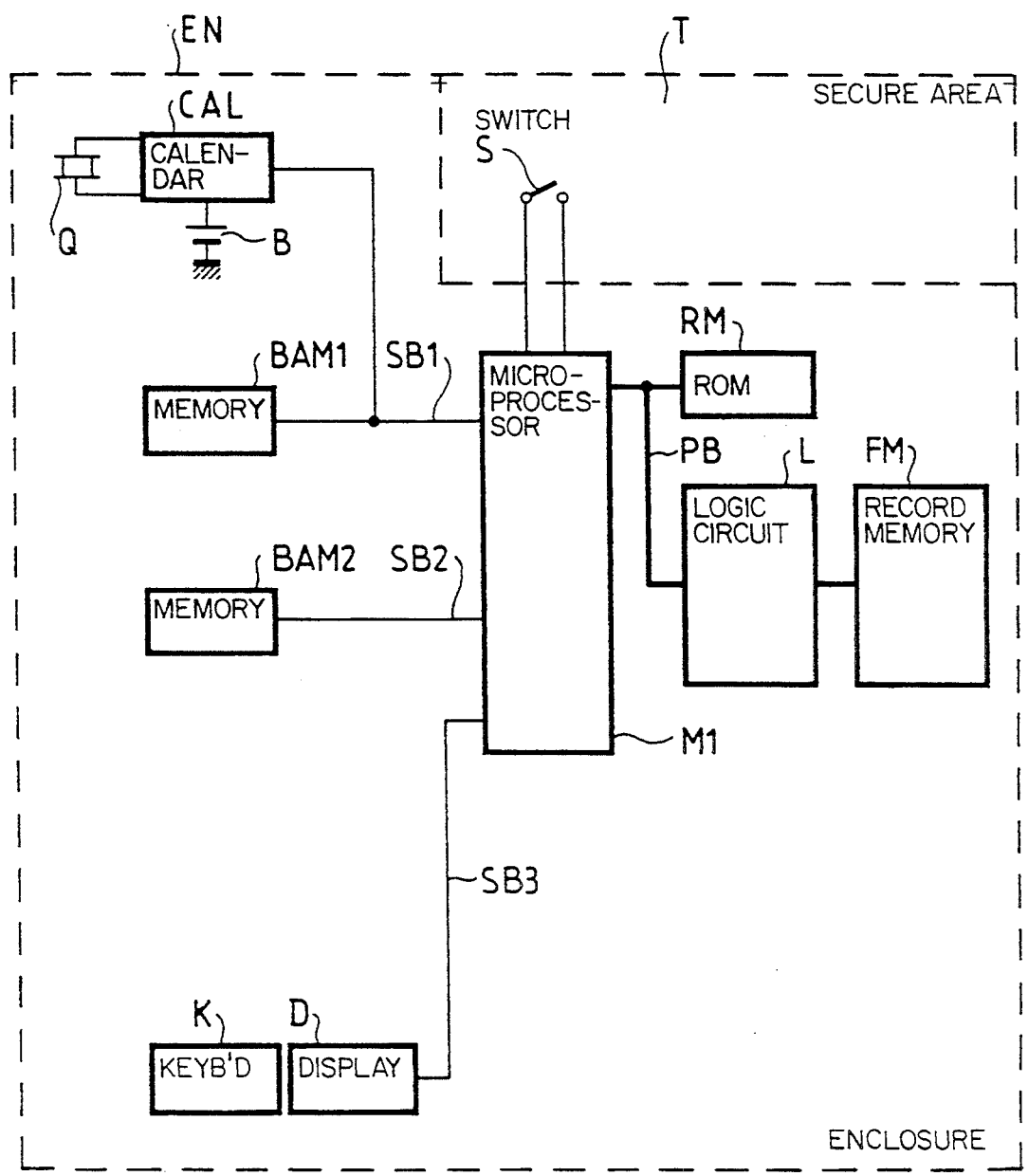
FIGS. 2 and 3 are block diagrams of two respective variants of this embodiments.

FIG. 2 shows the block diagram of a first variant of this embodiment of the invention. In this variant the record memory FM is not connected to the bus SB2. Only the keyboard K and the display D use the bus SB3. The memory FM is connected to the parallel bus PB by a logic circuit L for demultiplexing and storing each address sent by the microprocessor M1 to the memory FM. The circuit L receives an address on 19 bits in the form of three consecutive bytes and converts it into the form of a 19-bit binary word which can be used as an address of the record memory FM. With the microprocessor M2 eliminated, it is the microprocessor M1 which writes the information blocks into the memory FM. When the franking machine is switched on the microprocessor M1 writes a "time" block into the memory FM. For a machine which is switched on continuously the microprocessor M1 writes a block of information into the memory FM whenever any of the monitored parameters changes. The circuit L merely transmits the blocks without modifying them.

The circuit L may be a programmable array of logic gates or a custom circuit integrated into the same microchip as the microprocessor M1.

Figure 3:
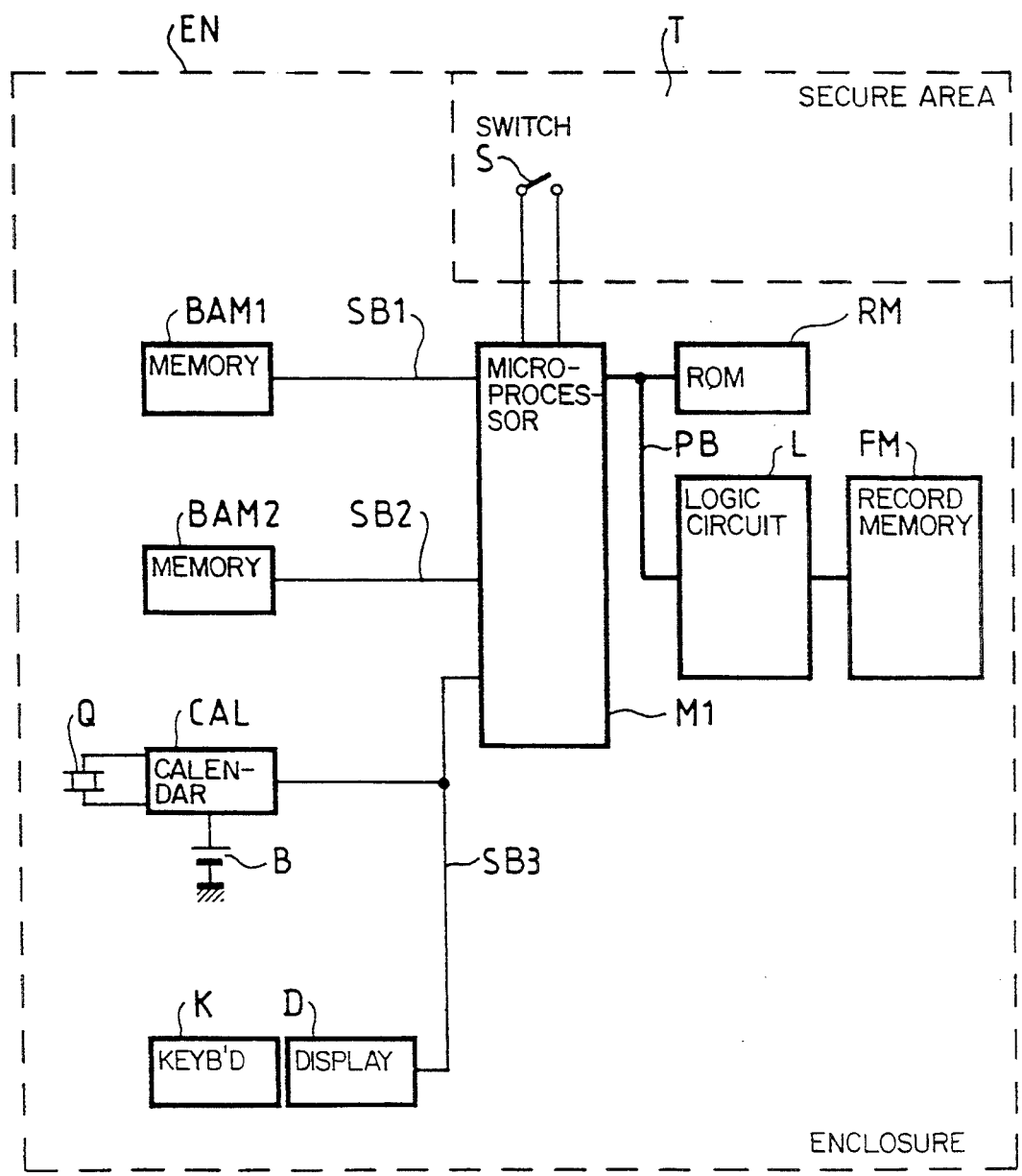

FIG. 3 shows the block diagram of another variant of this embodiment of the invention. In this variant the two buses SB1 and SB2 are used exclusively for reading and writing the memories BAM1 and BAM2, respectively. This further enhances the security of the information stored in these memories. The calendar circuit CAL is connected in parallel with the keyboard K and the display D to the bus SB3. The record memory FM is connected to the parallel bus PB by a logic circuit L for multiplexing and locking the addresses supplied by the microprocessor M1 on the parallel bus PB, as in the variant shown in FIG. 2.

The information stored in the memory FM can be read by connecting a serial bus interface to the bus SB2 in the FIG. 1 example and by connecting a parallel bus interface to the bus PB in the FIG. 2 and 3 examples. Simple calculating means, the design of which is familiar the person skilled in the art, can use this information to establish statistics or itemized bills.

The provision of a calendar circuit protected against fraud enables generation of statistics based on the actual date and the production of daily itemized bills. If the actual date is not regarded as necessary the implementation can naturally be simplified by eliminating the calendar circuit. This may be in the form of an optional plug-in circuit board.

There is claimed:

1. In a franking machine having a postage processing means for carrying out franking operations and a non-volatile flash memory operatively connected to said postage processing means, each franking operation having a set of franking characteristics including a postage value monitored by said postage processing means, a method for storing into said memory, in historical sequence, characteristic information of said franking operations carried out by said postage processing means during a long period of time, comprising the steps of:

a) at each current franking operation following an immediately preceding franking operation, comparing the characteristics of said current franking operation with those of said preceding franking operation, b) if the characteristics of said current franking operation are not different from those of said preceding franking operation, not writing any information into said memory, c) if at least one of the characteristics of said preceding franking operation differs from that of said current franking operation, writing into said memory characteristic information indicative of each characteristic of said preceding franking operation which has changed along with a number of consecutive franking operations which have occurred prior said current franking operation and have the same characteristics which have changed, said characteristic information being stored in the form of fixed length data blocks stored in sequence at successive locations of said memory, each data block including a code representative of one monitored characteristic.

2. The method to claim 1, comprising the step of writing a data block indicative of a current date into said memory each time the machine is switched on, said current date being provided by a calendar circuit operatively connected to said postage processing means.

3. The method of claim 1, comprising the step of writing a data block indicative of a total postage amount for all franking operations into said memory at periodic intervals.

* * * * *